(12) United States Patent
Wahlsteen

(10) Patent No.: US 6,829,872 B2
(45) Date of Patent: Dec. 14, 2004

(54) PROCESS AND DEVICE FOR CONNECTING I-BEAMS

(76) Inventor: William J. Wahlsteen, 208 Gibson Ave., Brentwood, NY (US) 11717-5036

(*) Notice: Subject to any disclaimer, the term of this patent is extended or adjusted under 35 U.S.C. 154(b) by 0 days.

(21) Appl. No.: 10/100,931

(22) Filed: Mar. 19, 2002

(65) Prior Publication Data

US 2003/0177732 A1 Sep. 25, 2003

(51) Int. Cl.[7] ............................................. F16B 17/00
(52) U.S. Cl. ..................... 52/741.1; 52/655.1; 52/726.2; 403/256; 403/292; 403/337
(58) Field of Search .......................... 52/741.1, 655.1, 52/726.2; 403/286, 287, 292, 293, 335, 336, 337, 338, 256, 257

(56) References Cited

U.S. PATENT DOCUMENTS

| | | | |
|---|---|---|---|
| 1,214,738 A | | 2/1917 | Wolf |
| 1,258,408 A | | 3/1918 | Hill |
| 1,786,145 A | | 12/1930 | Boykin, Jr. |
| 1,883,376 A | * | 10/1932 | Hilpert et al. ............. 52/654.1 |
| 2,106,084 A | * | 1/1938 | Coddington ................ 52/376 |
| 2,228,509 A | * | 1/1941 | Dean .......................... 105/397 |
| 2,456,055 A | * | 12/1948 | Farrar ........................ 403/230 |
| 2,619,687 A | | 12/1952 | Kahn |
| 2,675,895 A | * | 4/1954 | Lowenstein ................ 52/236.3 |
| 2,723,107 A | * | 11/1955 | Parker ........................ 256/24 |
| 4,014,089 A | * | 3/1977 | Sato et al. ................ 29/525.11 |
| 4,074,947 A | * | 2/1978 | Matake et al. .............. 403/231 |
| 4,095,912 A | | 6/1978 | Hagberg |
| 4,111,578 A | * | 9/1978 | Sato et al. ................... 403/189 |
| 4,124,123 A | | 11/1978 | Armington et al. |
| 4,577,449 A | * | 3/1986 | Celli ........................... 52/737.2 |
| 4,688,358 A | * | 8/1987 | Madray ....................... 52/93.2 |
| 5,022,209 A | * | 6/1991 | Kimura ........................ 52/646 |
| 5,503,493 A | * | 4/1996 | Kato et al. ................... 403/312 |
| 5,600,924 A | * | 2/1997 | Forsberg ...................... 52/93.2 |
| 5,941,044 A | * | 8/1999 | Sera ........................... 52/655.1 |
| 6,059,482 A | * | 5/2000 | Beauvoir ..................... 403/262 |
| 6,073,405 A | | 6/2000 | Kasai et al. |
| 6,076,325 A | | 6/2000 | Sluiter |
| 6,138,427 A | * | 10/2000 | Houghton ................... 52/655.1 |
| 6,230,467 B1 | * | 5/2001 | Leek ............................ 52/702 |
| 6,516,583 B1 | * | 2/2003 | Houghton ................... 52/655.1 |

* cited by examiner

Primary Examiner—Brian E. Glessner
(74) Attorney, Agent, or Firm—Collard & Roe, P.C.

(57) ABSTRACT

A connecting plate for connecting I-beams together. The connecting plate contains at least two plates that each have a series of holes drilled in them. These series of holes are drilled offset from each other in each plate. The connecting plate can be in the form of a flat face, an L-shaped plate or a partially H-shaped plate. The offset holes on these plates allow the plates to be connected to a first I-beam first, and then connected to a second I-beam. This design allows a user to forgo coupling the first I-beam, the coupling plate and the second I-beam together all at the same time which improves the safety and efficiency of coupling I-beams together.

4 Claims, 5 Drawing Sheets

PROCESS AND DEVICE FOR CONNECTING I-BEAMS

BACKGROUND OF THE INVENTION

The following references are known in the art: U.S. Pat. Nos. 6,076,325; 6,073,405; 4,095,912; 4,124,123; 2,619,687; 1,786,145; 1,258,408; 1,214,738 of which all are incorporated by reference.

Work in the construction industry can be quite dangerous. The joining of I-beams together is an especially dangerous act because connecting two I-beams together may result in injury if these I-beams start to shift during the connection process. Therefore, it is important to get these two I-beams connected together quickly and safely. To achieve this goal, the I-beams must be connected together in a preliminary manner, to hold the I-beams together so that they can be subsequently connected together in a more permanent manner.

The present state of the art suffers from the following problem in that none of the references cited describe an I-beam connector that connects two different I-beams together using two sets of holes offset from each other so that these I-beams can remain preliminarily connected before they are fully connected together.

SUMMARY OF THE INVENTION

The present invention was designed to overcome the problems of the art by presenting an I-beam connector that connects two or more I-beams together in both a preliminary manner and then subsequently in a more permanent manner. Essentially, there is an I-beam connector that is made from at least one plate that can have two different series of holes offset from each other. These holes are offset from each other so that two different I-Beams can be connected to at least one connecting plate individually and sequentially.

The present invention can take the form of up to two different embodiments. In the first embodiment, the connector is an L-shaped plate having two sets of holes offset from each other so that two different I-beams can be connected together at a right angle. In the second embodiment, the connector is a partially H-shaped plate that is designed to couple to both sides of an I-beam.

Regardless of the type of embodiment or plate used, the plate is used to fasten first to a first I-beam and then to a second I-beam. The process occurs by creating a plurality of holes in a first I-beam by drilling punching, or any other method known in the art. Next, a second set of holes are drilled into the second I-beam. The connector is fastened in an offset manner so that a first connector can be coupled to the I-beam and next, a second connector can be coupled to the I-beam. Next, The connector is then fastened to the first I-beam. Once the connector is fastened to the I-beam, the second I-beam is fastened to the connector. Finally, a third I-beam can be connected to a connecting plate, wherein this third I-beam joins with the first and the second I-beam in an offset manner. In that way, a user can connect the connector first to the first I-beam without the second I-beam being involved. This results in a safer process for coupling two or more different I-beams together because a user has a much greater chance of injuring herself when coupling two or more different I-beams and a connector all at once.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

In the drawings wherein similar reference characters denote similar elements throughout the several views.

DETAILED DESCRIPTION OF THE PREFERRED EMBODIMENT

Figure 1:
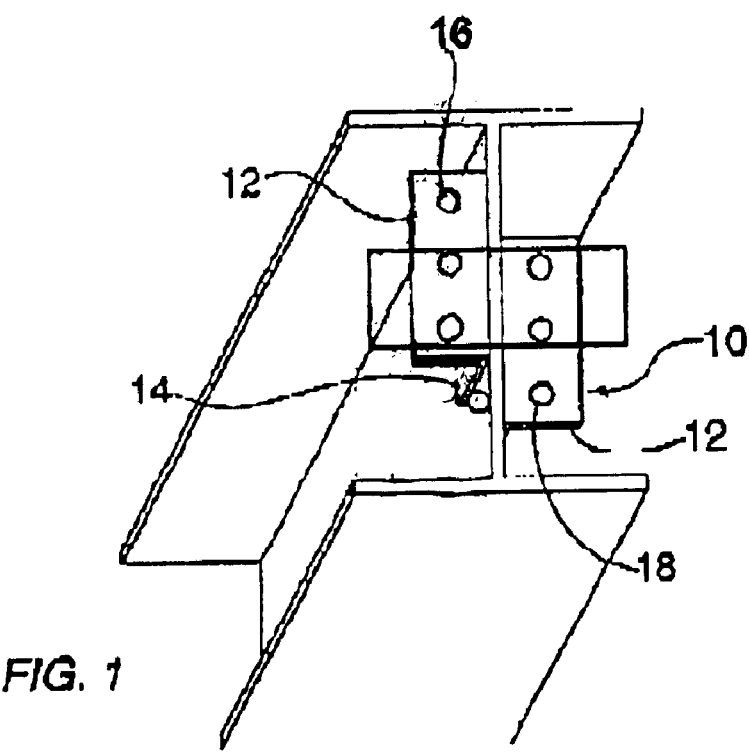
FIG. 1 is a front perspective view of a first embodiment of the device for connecting I-beams.
Figure 2:
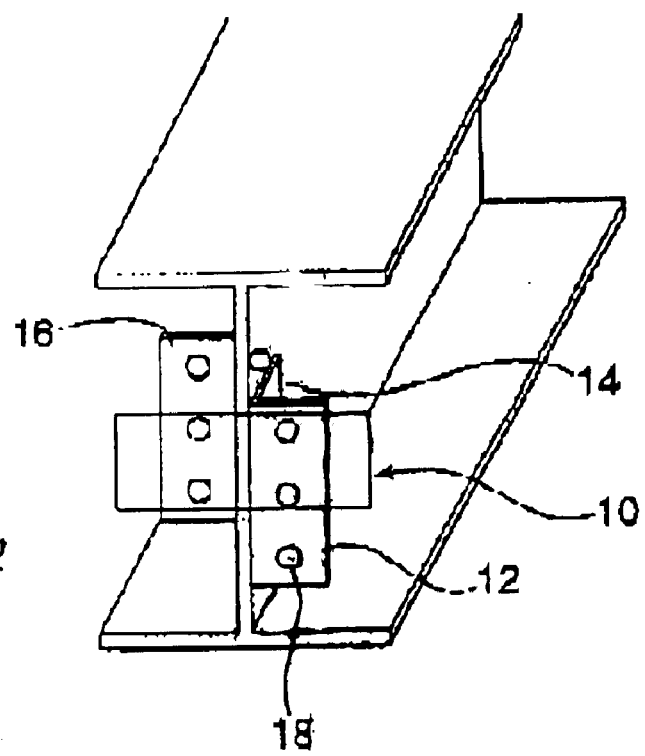
FIG. 2 is a second front perspective view of the device.
Figure 5:
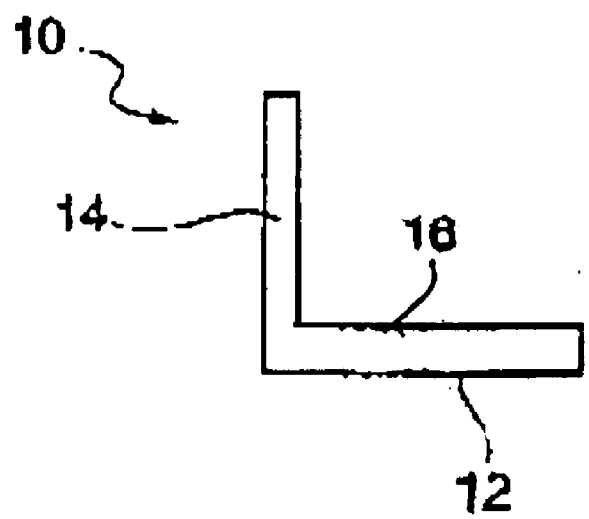
FIG. 5 is a side profile view of a first embodiment of a connecting plate shown in FIG. 1.

FIGS. 1 and 2 are front perspective views of the connecting device 10 containing a first plate 12 and a second, offset plate 14 and series of pre-drilled holes 16 and 18. As shown in FIG. 5, this plate is essentially L-shaped wherein as shown in FIG. 1, the first plate 12 is set at one level having drill holes 16 and the second plate 14 is set at a second level having drill holes 15 offset from first plate 12. Because of the shape of this plate, two different I-beams can be bolted to the connecting plate individually and sequentially, wherein the connection plate 10 can first be connected to the first I-beam and then connection plate 10 can be connected to a second I-beam.

Figure 3:
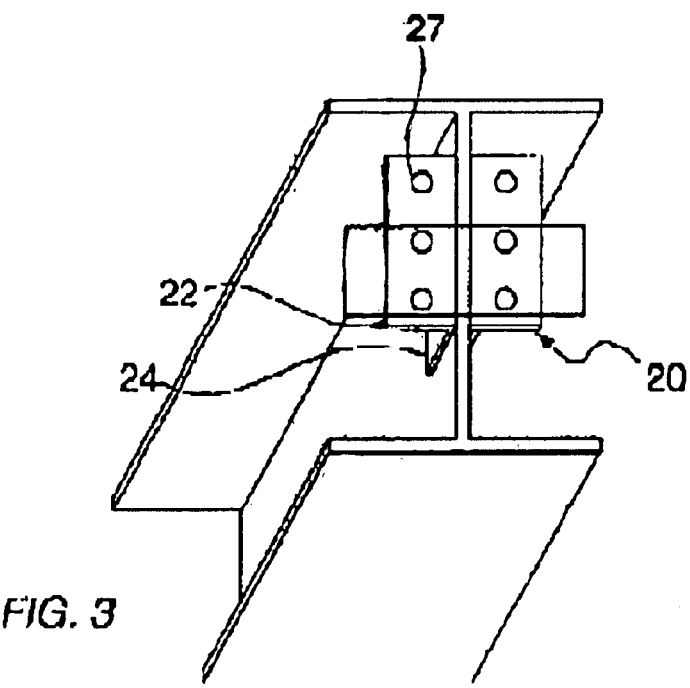
FIG. 3 is a first perspective view of the second embodiment of the device.
Figure 4:
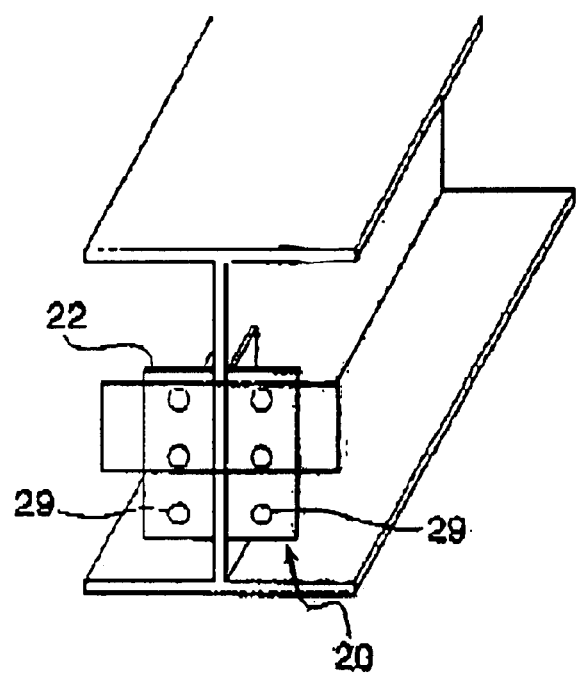
FIG. 4 is a second perspective front view of the device.
Figure 6:
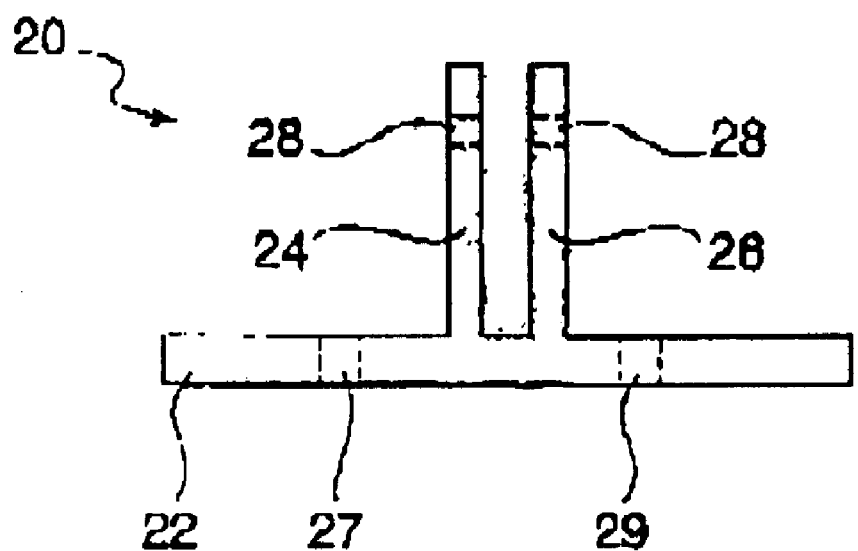
FIG. 6 is a side profile view of a second embodiment of a connecting plate.

As shown in FIGS. 3, 4 and 6 there is also a second type plate 20 that can be used to couple I-beams together. This second type plate 20, essentially functions as two L-shaped plates coupled together and forms a partially H-shaped plate. This partially H-shaped plate has a front plate 22 and two coupling plates 24 and 26 extending substantially normal to front plate 22 forming a slot 25. As shown in FIG. 6, coupling plates 24 and 26 have a series of pre-drilled holes 28 extending down the face of the plate wherein these holes allow plate 20 to be coupled to a first I-beam having a series of pre drilled holes. Front plate 22 has two series of holes 27 and 29 extending down its face. In that way, this second type plate 20 can be coupled first to the end of an I-beam. Next, a second I-beam having a series of pre-drilled holes is coupled to this plate in a transverse manner.

Figure 7:
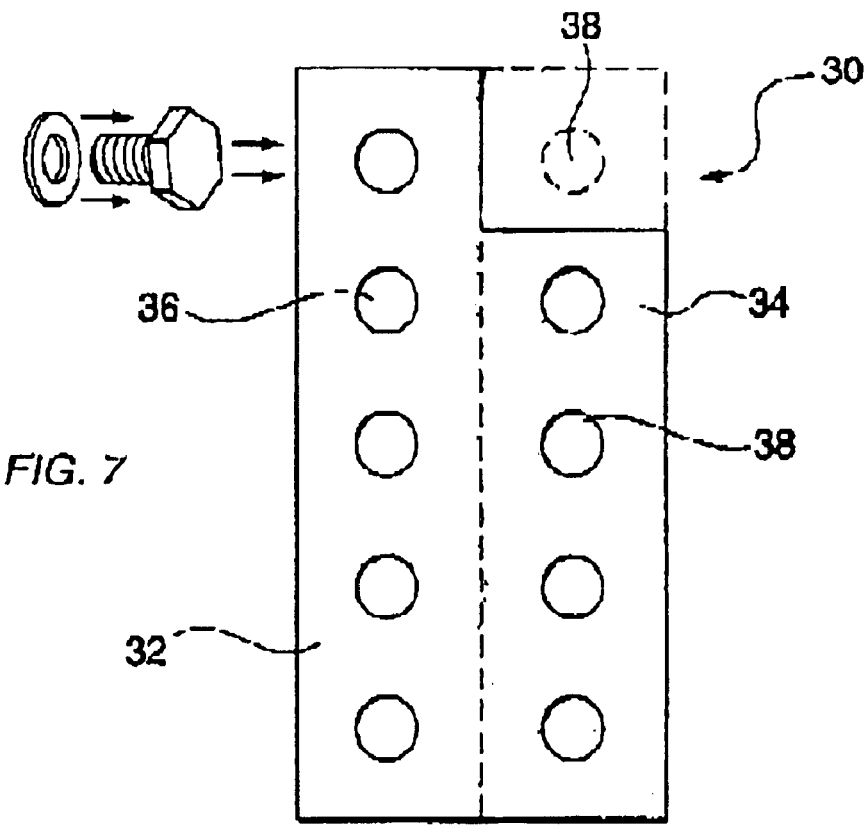
FIG. 7 is a front view of a third embodiment of a connecting plate.

FIG. 7 shows a third embodiment of the coupling plate 30 which shows a first plate 32 coupled to a second plate 34. First plate 32 has a plurality of holes 36 while second plate 34 has a plurality of holes 38. This style coupling plate 30 contains one side 32 that is larger than an adjacent side 34. Thus, when this coupling plate 30 is placed down, a top hole 36 can be used to couple the plate to an I-beam. Next, a second plate of the same style can be placed on an opposite side of the I-beam, wherein this plate is flipped so that it forms a mirror image of the first plate. Thus, when this first plate is placed down, it contains a gap which is open in the position of where the bolt is placed, without affecting an adjacent plate. Thus, these plates can be coupled to I-beams with a first bolt without affecting plates placed opposite them on an opposite side of the I-beam. Previously, both plates had to be placed on opposite sides of the I-beam simultaneously to thread a single bolt through both plates and the I-beam.

Figure 8:
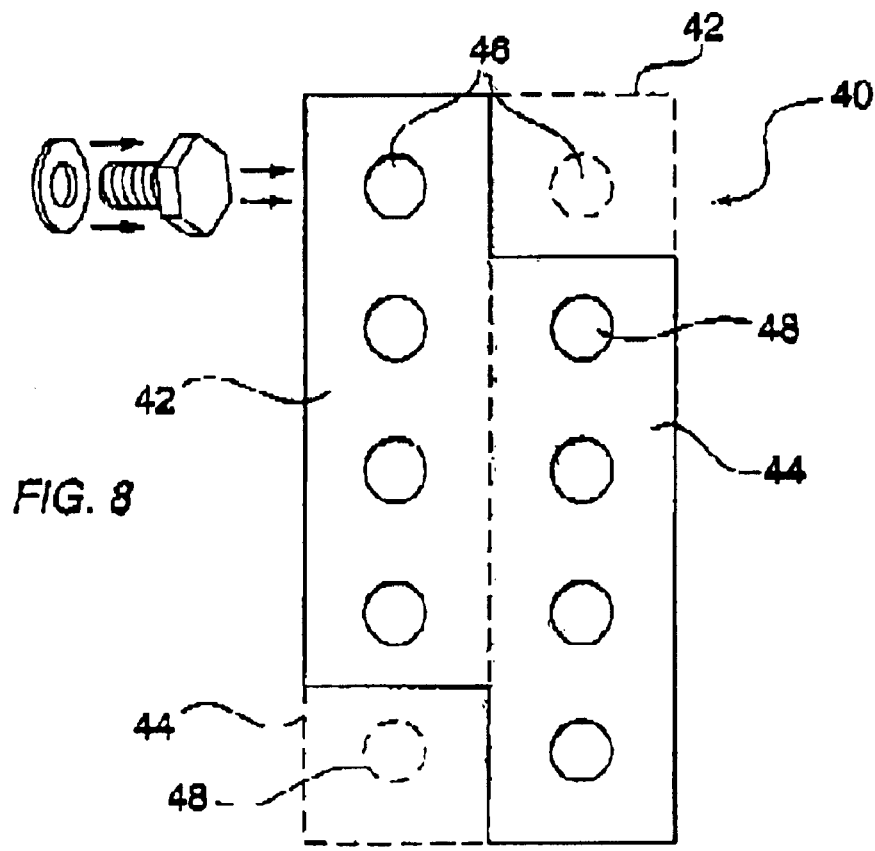
FIG. 8 is the front view of another embodiment of the connecting plate.
Figure 9:
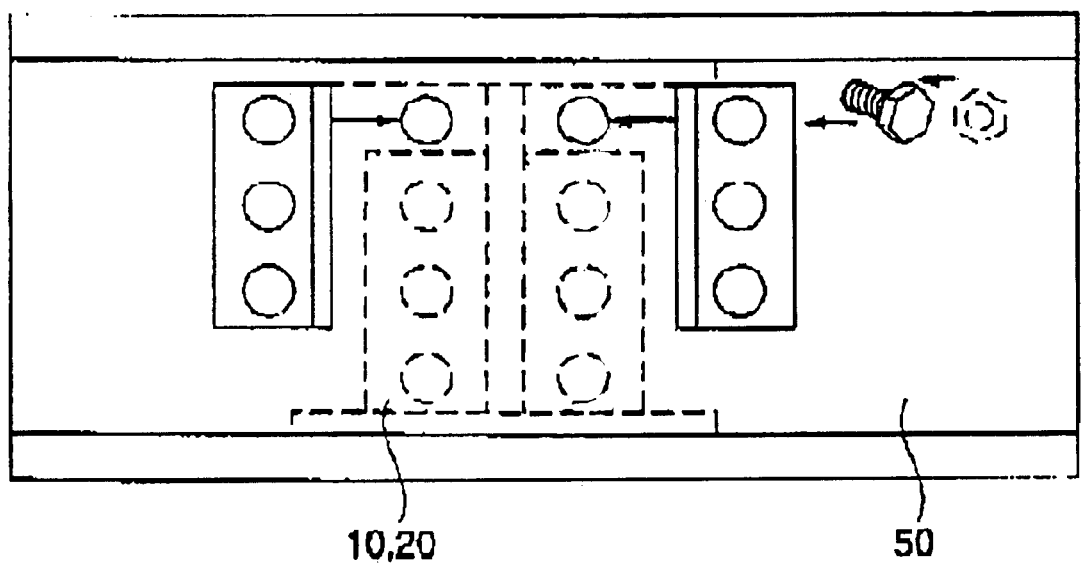
FIG. 9 shows the coupling of the connecting plate to an I-beam.

FIG. 8 shows a similar type-plate that can be used. In this case, this new plate 40 comprises two plates 42 and 44 coupled together in an offset manner wherein these plates are of the same length. Plates 42 and 44 are coupled together so that they are offset by exactly one drill hole with drill hole 46 being on plate 42 and drill hole 48 being on plate 44. Plates 40 can be placed opposite each other on a beam so that they form mirror images of each other as shown in FIG. 8. With this design, hole with the mirror image plate, hole 46 is opposite a gap in plate 44 while hole 48 is opposite a gap in plate 42. Thus, with this design, each plate can be coupled to opposite sides of the I-beam at different time intervals without affecting the oppositely placed plate. This example is shown in FIG. 9 wherein two different sets of plates are placed on an intermediate I-beam 50 with openings opposite drill holes on an oppositely placed connector plate. As shown, a first connector plate can be coupled to an intermediate I-beam without interfering with an opposite connector plate.

Accordingly, while several embodiments of the present invention have been shown and described, it is to be understood that many changes and modifications may be made thereunto without departing from the spirit and scope of the invention as defined in the appended claims.

What is claimed is:

1. A process for coupling a set of coupling plates together with an I-beam comprising the following steps:
   a) providing a first I-beam having ends, and an intermediate region having a plurality of drill holes;
   b) coupling at least one first coupling plate having a top edge to said intermediate region of said first I-beam by inserting a fastener into said at least one first coupling plate and at least one of said plurality of drill holes; and
   c) coupling at least one second coupling plate having a top edge to said first I-beam, wherein said at least one second coupling plate is positioned on an opposite side of said first I-beam, substantially opposite said at least one first coupling plate but with said top edge of said at least one second coupling plate offset vertically from said top edge of said at least one first coupling plate by at least one drill hole such that said second coupling plate does not intersect said fastener.

2. The process as in claim 1, further comprising the step of coupling at least one additional I-beam to said at least one first coupling plate so that when said first coupling plate is coupled to said first I-beam, said at least one additional I-beam extends in a substantially perpendicular manner to said first I-beam.

3. The process as in claim 2, wherein said step of coupling said at least one additional I-beam to said at least one first coupling plate occurs before said at least one first coupling plate is coupled to said first I-beam.

4. A process for coupling a set of coupling plates together with an I-beam comprising the following steps:
   a) providing a first I-beam having ends, and an intermediate region having a plurality of drill holes;
   b) coupling at least one first coupling plate having a bottom edge to said intermediate region of said first I-beam by inserting a fastener into said first coupling plate and at least one of said plurality of drill holes; and
   c) coupling at least one second coupling plate having a bottom edge to said first I-beam, wherein said at least one second coupling plate is positioned on an opposite side of said first I-beam, substantially opposite said at least one first coupling plate but with said bottom edge of said at least one second coupling plate offset vertically from said bottom edge of said at least one first coupling plate by at least one drill hole such that said at least one second coupling plate does not intersect said fastener.

* * * * *